No. 623,774. Patented Apr. 25, 1899.
J. T. FENTON.
BICYCLE SADDLE POST.
(Application filed Feb. 11, 1898.)

(No Model.)

WITNESSES:
A. V. Groupe
C. E. Parker

INVENTOR
Joseph T. Fenton
BY
H. V. Fenton
ATTORNEY.

UNITED STATES PATENT OFFICE.

JOSEPH T. FENTON, OF PHILADELPHIA, PENNSYLVANIA.

BICYCLE SADDLE-POST.

SPECIFICATION forming part of Letters Patent No. 623,774, dated April 25, 1899.

Application filed February 11, 1898. Serial No. 669,883. (No model.)

*To all whom it may concern:*

Be it known that I, JOSEPH T. FENTON, a citizen of the United States, residing in the city of Philadelphia, State of Pennsylvania, have invented certain new and useful Improvements in Bicycle Saddle-Posts, of which the following is a full, clear, and exact description, reference being had to the accompanying drawings, forming a part of this specification.

My invention relates to bicycle saddle-posts, and has for its object to provide means whereby the saddle may have a permissible horizontal reciprocatory movement controlled by resilient devices; and to this end my invention consists in substituting for the usual rigid fastening between the post and the saddle mechanism hereinafter described mounted upon and forming a part of the post, which will permit the saddle clamped thereto to have a horizontal reciprocatory movement longitudinally against spring-pressure, tending to restore the saddle mounted on the movable saddle-bar to its normal position relatively to the rigid post of the bicycle.

Figure 1:
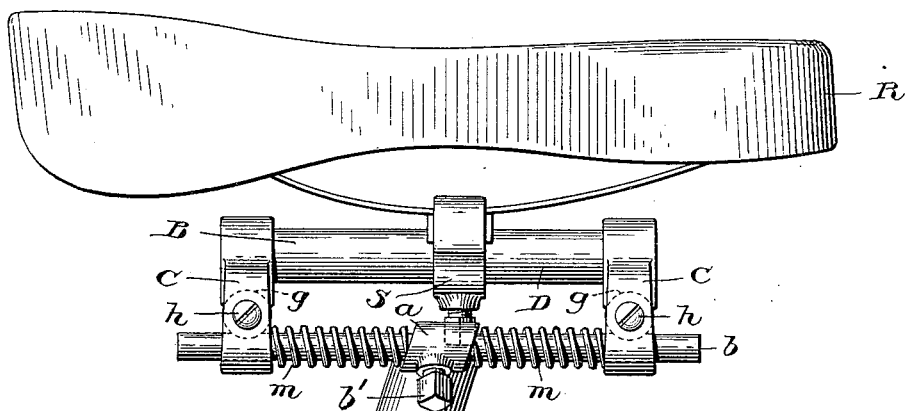
Figure 2:
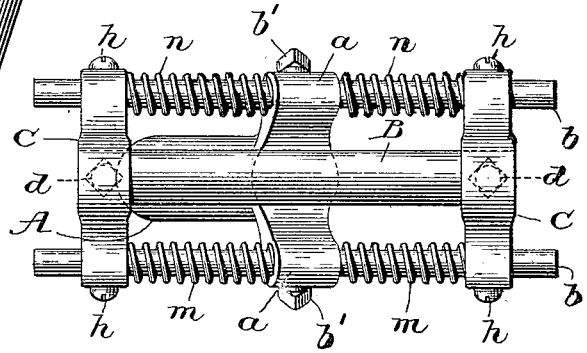

In the accompanying drawings, illustrating my invention, Figure 1 is a side elevation of my improved saddle-post, showing a saddle in position clamped to the saddle-bar. Fig. 2 is a plan view with the saddle removed, and Fig. 3 is an end view of the same.

Heretofore the rigid post A (which is angularly mounted relatively to the plane of the seat) has been provided with a hollow saddle-bar B, usually made fixedly secured to the post, in the concave seat or face thereof, (indicated at B', Fig. 3,) although I believe it has been proposed to mount the saddle-bar upon a rod or plunger working against a spring in the hollow center of the post A. My invention can be applied to either.

The saddle-post A is constructed with bracket-ears $a\ a$, longitudinally recessed to admit the passage therethrough of two bearing-rods $b\ b$ and clamped in position by set-screws $b'\ b'$. Upon these two bearing-rods are mounted at or near each end a pair of saddle-bar frames C C, these being held in position on and mutually supporting the hollow saddle-bar B, which is clamped to each of the same, as indicated at $B^2$ in Fig. 3, by the set-screws $d\ d$, as shown in Figs. 2 and 3.

Figure 3:
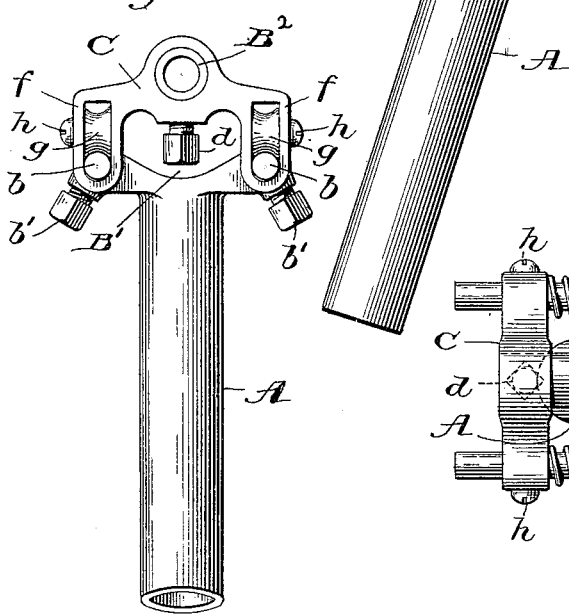

The saddle-bar bracket-frames C are best shown in end view in Fig. 3, where it will be seen that they are recessed in each side at $f$, in each of which recesses is mounted an idler guide-wheel $g$, having its bearings on a screw $h$. The rods $b\ b$, which, as before stated, are clamped in the recess of the ears $a$ of the post A by the clamping set-screws $b'\ b'$, are free to slide lengthwise in the recesses $f$ of the bracket-frames C C, and their true and easy reciprocation therein without friction is effected and guided by the guide-wheel $g$. Mounted on the rods $b\ b$ are coiled springs $n\ n$ and $m\ m$, having bearings between the central ears $a\ a$ and the frames C C. Any usual form of bicycle-saddle, such as R, Fig. 1, provided with the usual clamp S, is clamped to the saddle-bar B in the usual manner. With my device it can be adjusted thereon centrally or at any point, which is a great advantage, and the limit of reciprocation of the seat and the sliding frame on which it is mounted can be controlled and fixed at pleasure by moving either or both of the bracket-frames C C on the saddle-bar B closer to or farther from the fixed seat-clamp S and then refastening the set-screws $d$, as indicated in Figs. 3 and 1, and I may add that a further adjustability incidental to the construction shown may be had by adjusting the bars $b\ b$ at any point in the recessed ears $a\ a$ of the saddle-post A by means of the clamping set-screws $b'\ b'$.

The operation of the device is as follows: The saddle, instead of being rigidly secured to the frame of the wheel, is free to reciprocate relatively to the frame, the saddle-bar frames C C being free to slide on the rods $b\ b$, rigidly secured to the bracket-ears $a$ of the post A, and this reciprocation is resilient, because it takes place against the counteracting pressure of the springs $m\ m$ in either direction, and which therefore tend to keep the seat in its normal position relatively to the rigid saddle-post.

Having thus described my invention, what I claim as new, and desire to secure by Letters Patent, is—

1. The combination with the upright saddle-post of a bicycle, of a pair of horizontal bars clamped thereto, a pair of bracket-frames mounted on said bars; resilient devices between the frames and the post, on either side thereof, a saddle-bar mounted rigidly at either end in said bracket-frames, whereby the saddle-bar may be horizontally reciprocated relatively to the saddle-post, against resilient pressure in either direction; substantially as described.

2. The combination with the upright saddle-post of a bicycle, of a pair of horizontal bars clamped thereto, a pair of bracket-frames mounted on said bars in such manner as to be free to reciprocally slide thereon in a longitudinal direction, clamping devices operating to adjust and control the limit of reciprocation, a horizontal saddle-bar rigidly mounted on the bracket-frames, and spring devices between the saddle-post and sliding bracket-frames operating to resiliently control said reciprocation; substantially as described.

3. The combination with the upright saddle-post of a bicycle, having ears $a, a,$ of a pair of horizontally-arranged bars $b, b,$ clamped to said ears; a pair of bracket-frames C, C, having recessed ends $f, f,$ with a guide-wheel $g$ mounted therein, said frames being mounted upon and adapted to slide on the bars $b, b;$ coiled springs $m, m,$ and $n, n,$ on said bars arranged respectively on either side of the central mounting thereof; and a saddle-bar B fixedly secured by each end in said frames C, C, and adapted to be reciprocated thereby; substantially as described.

In testimony whereof I have hereunto affixed my signature this 9th day of February, A. D. 1898.

JOSEPH T. FENTON.

Witnesses:
WALTER C. PUSEY,
H. T. FENTON.